N. N. FARLOW.
FRUIT JAR CLAMP AND HOLDER.
APPLICATION FILED SEPT. 15, 1921.
1,408,184.                                    Patented Feb. 28, 1922.
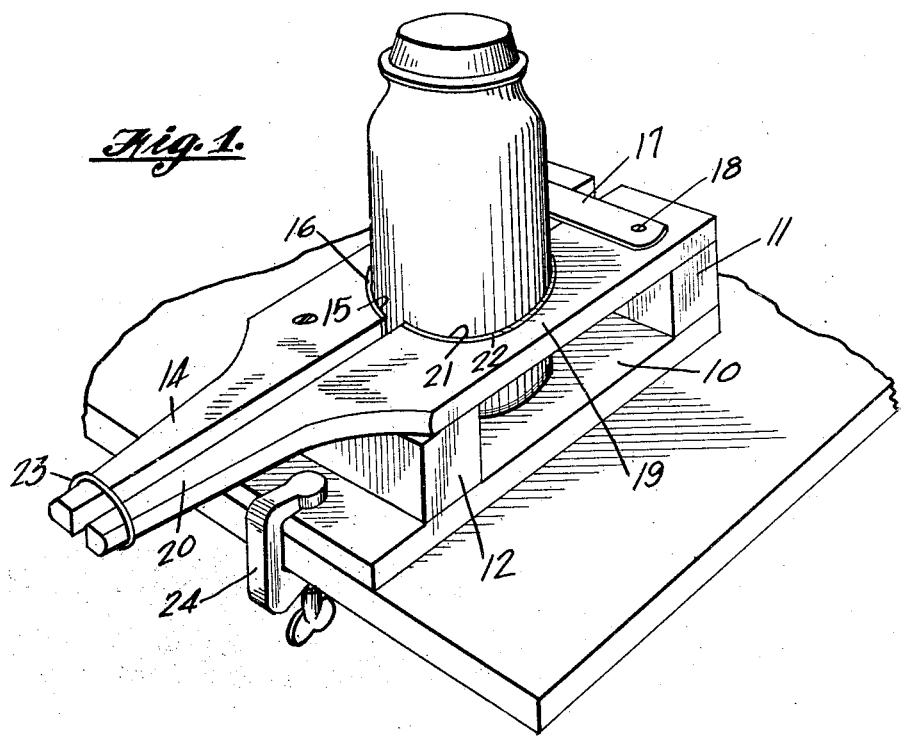
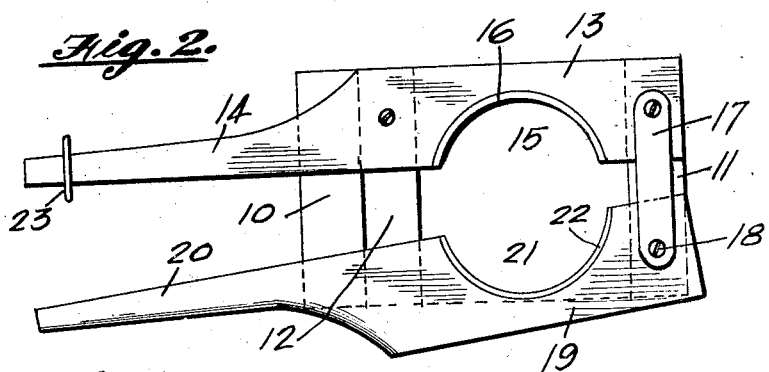
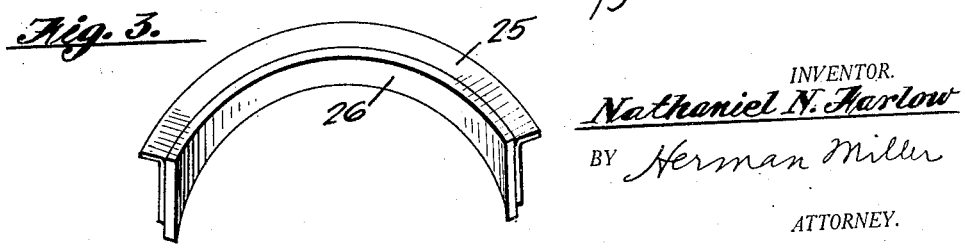
INVENTOR.
Nathaniel N. Farlow
BY Herman Miller
ATTORNEY.

UNITED STATES PATENT OFFICE.

NATHANIEL N. FARLOW, OF PASADENA, CALIFORNIA, ASSIGNOR OF ONE-HALF TO BRITA R. FARLOW, OF PASADENA, CALIFORNIA.

FRUIT-JAR CLAMP AND HOLDER.

1,408,184.  Specification of Letters Patent.  Patented Feb. 28, 1922.

Application filed September 15, 1921. Serial No. 500,827.

*To all whom it may concern:*

Be it known that I, NATHANIEL N. FARLOW, a citizen of the United States, residing at Pasadena, in the county of Los Angeles and State of California, have invented new and useful Improvements in Fruit-Jar Clamps and Holders, of which the following is a specification.

My invention relates to a fruit jar clamp and holder, the principal object of my invention being to provide a relatively simple, practical and efficient device that is adapted to clamp and firmly hold fruit jars or the like while the same are being filled with heated fruit or vegetables and while the caps or covers of said jars are being tightly screwed thereonto or removed therefrom and further to provide a device of the character described that may be easily and cheaply produced.

With the foregoing and other objects in view my invention consists in certain novel features of construction and arrangement of parts that will be hereinafter more fully described and claimed and illustrated in the accompanying drawings in which:

Fig. 1 is a perspective view of a fruit jar clamp and holding device of my improved construction.

Fig 2 is a plan view of the device.

Fig. 3 is a perspective view of a detachable liner for the jar engaging jaws and which will permit the latter to clamp and hold jars of different diameters.

Referring by numerals to the accompanying drawings which illustrate a practical embodiment of my invention, 10 designates a base preferably formed of wood and substantially rectangular in shape and fixed in any suitable manner to the rear end of said base is a transversely disposed block 11.

Fixed on the upper face of the front portion of the base 10 is a transversely disposed block 12 and said last mentioned block and the block 11 are preferably the same height. Rigidly fixed in any suitable manner on top of the blocks 11 and 12 and above the left hand portions thereof, is a jaw 13 provided on its forward end with a forwardly projecting handle 14 that gradually decreases in width toward its forward end.

Formed in the inner portion of this jaw between the blocks 11 and 12 is a semi-circular recess 15 and the curved edge of the jaw within this recess is lined with a strip of rubber, leather or analogous material.

Secured to the rear end of jaw 13 above the block 11 is one end of a transversely disposed plate 17, the outer end of which is secured to the right hand portion of block 11 by a screw or pin 18 and pivotally mounted on the latter is the rear end of a movable jaw 19 having at its forward end a forwardly projecting handle 20 that gradually decreases in width toward its forward end.

Formed in the inner portion of the pivotally mounted jaw 19 is a semi-circular recess 21 that is the counter part of the recess 15 and the curved edge of the jaw around said recess is provided with a lining strip 22 of rubber, leather or analogous material.

A ring or loop 23 preferably of metal is adapted to encircle the handles 14 and 20 when the jaws are moved toward each other to clamp an interposed jar as illustrated in Fig. 1 and thus the jaws are retained in jar engaging position and consequently enabling the person engaged in filling fruit jars to use both hands in filling the jars or in the placing of the caps or covers on said jars.

The entire device is firmly secured on top of a table or like support by a clamping device such as 24 which engages on top of the forward end of base 10 and beneath the edge of the table or other support.

In order that the device may readily clamp or hold jars of different sizes, for instance, pints or quarts, removal liners of the type illustrated in Fig. 3 are provided and which latter may be positioned on the jaws 13 and 19 directly against the semi-circular recess therein. Each of these liners comprise a semi-circular strip 25 of metal that is substantially of inverted L-shape in cross section and secured to the inner face of the vertical leg of said L-shaped member is a strip 26 of rubber, leather or analogous material.

The facing strips 16 and 26 are effective in gripping the surfaces of jars positioned between the jaws and when the movable jaw is swung to its limit of movement, toward the fixed jaw, said movable jaw may be locked or retained in such position by moving the ring 23 as far as possible inwardly upon the tapered handles 14 and when an engaged jar is thus clamped it will be effectively held against rotation when the screw cap is being tightly screwed thereupon or removed therefrom.

A fruit jar clamping and holding device of my improved construction is comparatively simple, may be easily and cheaply produced and is very effective in performing its intended functions.

Various changes in the details of construction may be made by those skilled in the art without departing from the spirit of my invention as set forth in the appended claim.

I claim as my invention:

A fruit jar clamp and holder comprising a rectangular base, a block secured across the rear end of the base, a second block secured across the front part of the base, a jaw fixed on top of the blocks and having a forwardly projecting tapered handle and a semicircular recess in one side face between the blocks, a plate mounted transversely on the rear end of the jaw, a second jaw pivotally mounted between the plate and rear block and having a central semicircular recess in opposition to the first recess and resting upon the forward block and having the forwardly extending tapered handle matching the first handle, and a ring adapted to slide upon the two handles so that pressing the ring backwardly pulls the jaws together due to the taper of the handles.

In testimony whereof I have signed my name to this specification.

N. N. FARLOW.